United States Patent Office 2,698,222
Patented Dec. 28, 1954

2,698,222

METHODS OF AND APPARATUS FOR CALIBRATING MEASURING SYSTEMS FOR CONSTITUENT POTENTIALS

Raymond L. Davis II, Havertown, Pa., assignor to Leeds and Northrup Company, Philadelphia, Pa., a corporation of Pennsylvania Application October 22, 1949, Serial No. 122,946

26 Claims. (Cl. 23—232)

This invention relates to methods of and apparatus for determining the constituent potential of gases, more particularly to the determination of the constituent potential with respect to work undergoing treatment by gases such as in carburizing or nitriding of metals, and has for an object the provision of a method of, and apparatus for, calibrating the measuring system to compensate for changes in the sensitive element.

The present invention is particularly useful in connection with methods and apparatus of the type disclosed in copending application, Serial No. 596,792, filed May 30, 1945, for Control of Constituent-Potentials, now Patent No. 2,541,857. In said copending application there is set forth the manner in which change in an electrical characteristic of a detecting element, as resistance, varies with the constituent content thereof, which constituent is capable of reversible transference between the detecting element and an ambient medium. In said copending application there is further described the manner in which the sensitive element may be used for control of carburizing potential, or of nitriding potential in metal-treating furnaces. While the system of said copending application has been found to be highly useful, something has been left to be desired in increasing the accuracy of the measurement of the constituent potential and by way of the provision of a satisfactory calibrating system for the apparatus though in the hands of unskilled workers.

It is an object of the present invention to provide a method of, and apparatus for, precise calibration of the measuring system including the detecting or sensitive element in terms of concentration of a constituent therein. More particularly, it is an object of the invention to provide calibration of the measuring system which functions in response to the resistance change of a sensitive detecting element, such as a ferrous wire or filament in terms of carbon content.

In accordance with the present invention, advantage is taken of the fact that the sensitive element, ordinarily a filament of iron or an iron alloy, is capable of reducing of its constituent content, as carbon, to a reproducible minimum level. It has been found that the minimum level of the constituent, as carbon, in the filamentary element is the only known fixed point on the concentration-resistance curve. Since that minimum concentration point is both known and fixed, advantage is taken of it for calibrating the measuring network. The method and apparatus of the present invention may also be applied to other types of sensitive elements and to constituent concentrations other than carbon, as for example, nitrogen.

In carrying out the present invention in one form thereof, the sensitive element is subjected to a constituent-changing atmosphere progressively to bring the constituent in the element to a predetermined known value, as its minimum value. Where a constituent-reducing atmosphere is not of an oxidizing nature, calibration may take place at any time after the constituent potential has reached a minimum. If that minimum does not correspond to the known value of the minimum, an indication will be had as to what must be done to bring the system into calibration. If that minimum does not occur at the proper scale point of the measuring system, an element thereof is adjusted to bring the indicator to the proper scale point. Where the constituent-reducing atmosphere gradually changes to one of an oxidizing character, the resistance of the detecting element will gradually decrease to a minimum and for a period of time will stay at its minimum value. Upon initiation of oxidation, the resistance will rise. Advantage is taken of the reversal of the change in resistance to effect the calibrating operation. Alternatively, and a preferred mode of operation, is the completion of the calibrating operations before, or at the time of, initiation of the rise in resistance due to initiation of oxidation of the detecting element.

For a more detailed disclosure of the invention and for further objects and advantages thereof, reference may be had to the following description taken in conjunction with the accompanying drawings, in which.

Figure 1:
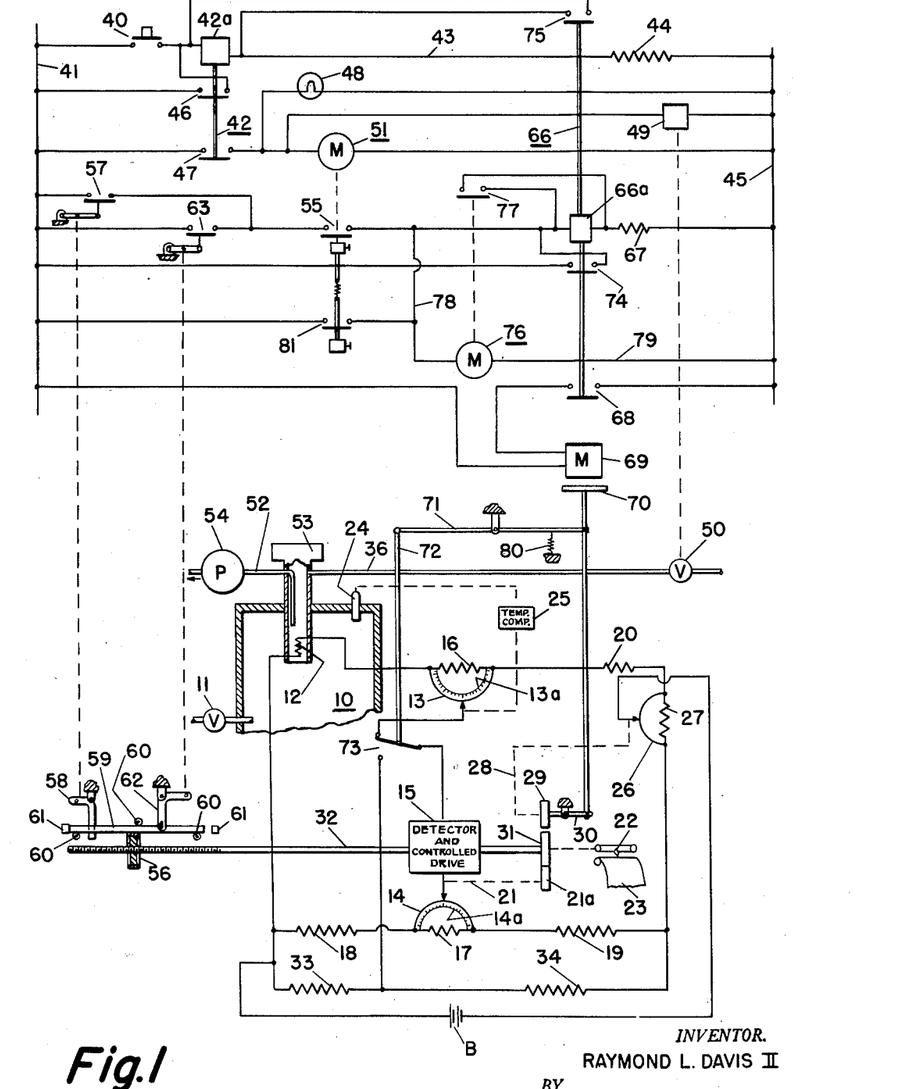
Fig. 1 diagrammatically illustrates a circuit diagram and certain structural features of one embodiment of the invention.

Referring to Fig. 1, the invention has been shown applied in one form to a carburizing furnace 10 having a control valve 11 regulating the admission of the carburizing agent to the furnace. The furnace 10 is provided with suitable heating means such as resistor elements (not shown) to maintain the temperature of the furnace, the work therein and the atmosphere thereof within the carburizing range upwardly of about 1400° F. The carburizing agent may be in liquid, gaseous or vapor phase. As has been fully set forth in said Patent No. 2,541,857, a sensitive element 12 may comprise a length of No. 40 A. W. G. iron wire, preferably the ferrous alloy described in Finch Patent 2,325,759. However, ferrous alloys of widely differing composition may be utilized so long as they are capable of reversible transference of carbon with the carburizing atmosphere. A wire of a ferrous alloy containing 5% nickel has also been found satisfactory since carbon is absorbed or given up by the sensitive detecting element until equilibrium conditions are attained. The electrical resistance of such a detecting element varies to a degree dependent upon the amount of carbon taken up or removed from the wire. For example, at a temperature of 1700° F., the resistance of the detecting element 12, of the ferrous alloy of the Finch patent, with 0.2% carbon therein, will be about 6.95 ohms, for a length of one and three-sixteenths inches; for the same temperature, the same wire with a carbon content of 1.00% C. will have a resistance of about 7.21 ohms.

In accordance with the present invention it has been found that the resistance for either the 0.2% carbon content or for the 1.00% carbon content will differ as between differing sensitive elements because of slight variations in physical dimensions, though they be of the same original composition. For a wire of any given size, the resistance change above the minimum level is uniform and yields accurate indication of relative change in carbon content of the sensitive element because the resistance change is always proportional to change in carbon content. Accordingly, the measuring system is calibrated at selected intervals of time in terms of the reduction of the carbon content of the sensitive element by a carbon-removing atmosphere to its reproducible minimum level. The manner in which this is done will be set forth immediately following identification of some of the principal components of the system of Fig. 1.

During normal operation of the carburizing furnace 10, say at 1600° F., for the carburization of work suitably supported within the furnace, the valve 11 may be manually or automatically operated in accordance with indications from a system including the element 12 to maintain the carbon potential of the carburizing atmosphere at a predetermined value. The automatic arrangement will be described in connection with Fig. 6, but has been omitted in Fig. 1 to simplify the present description. Such a system, and a manual system, includes a carbon-measuring circuit. In Fig. 1 the sensitive element 12, assumed to be of the alloy of said Finch patent, is included in the carbon-measuring circuit comprising a balanceable network of the Wheatstone bridge type including a temperature-compensating slidewire 13, a network-balancing slidewire 14 operable under the control of a detector and a controlled driving means 15.

The temperature-compensating slidewire 13 is preferably provided with a shunting resistor 16 to provide the desired range of temperature compensation. Similarly, the balancing slidewire 14 is provided with a shunting resistor 17 to provide the desired balancing range for the slidewire 14. End coils or resistors 18 and 19 are included in the network to predetermine, with the other elements thereof, the range of adjustment of the slidewire 14 relative to its associated contact for the range of change of resistance of element 12 between maximum and minimum carbon content thereof. A resistor 20 in the upper branch is provided for network-balancing purposes.

The detector and controlled drive 15 may comprise either a galvanometer and mechanical relay such as shown in Squibb Patent 1,935,732, or it may comprise a system of the type shown in Williams Patent 2,113,164. Any unbalance of the measuring circuit in either case will be effective through the mechanical connection indicated by the broken line 21 and gears 21a and 31 relatively to adjust the slidewire 14 with reference to its contact.

By driving an index and pen 22 relative to a scale and a record sheet or chart, as indicated at 23, an indication and record is provided of the carbon potential within the furnace 10.

Since temperature also affects the resistance of the sensitive element 12, there is provided within furnace 10 a temperature-responsive element 24 which, through a temperature-compensating control device 25, relatively adjusts the slidewire 13 with respect to its contact to compensate in the measuring network for changes in resistance of the element 12 due to change in its temperature. The temperature-compensating control 25 may include a galvanometer and mechanical relay as shown in said Squibb patent, operating in response to a thermocouple which may comprise the device 24, or a system such as one of those shown in said Williams patent may be utilized.

A calibrating slidewire 26 shunted by a range-determining resistor 27 is included in the network in series with the source of supply, as the battery B. Relative adjustment between the slidewire 26 and its contact is effected through a drive connection 28 extending from a gear, friction element, or other device 29 movable by a lever 30 into and out of driving engagement with the driving element 31 carried by the shaft 32 of the detector and controlled drive 15.

In accordance with the modification of the invention shown in Fig. 1, advantage is taken of the previously stated fact that for any sensitive element the minimum carbon content can be reduced to a reproducible minimum value in a carbon-removing atmosphere above the critical temperature of the element 12. More particularly, when the element 12 of the alloy of said Finch patent is subjected to a carbon-removing atmosphere, involving a CO, $CO_2$ system, the reproducible minimum carbon content attained by the sensitive element will be approximately 0.04% C. When subjected to a carbon-removing atmosphere including hydrogen and including some water vapor to accelerate the action, the minimum reproducible carbon content to which the element 12 can be reduced is an apparent —.05% C. The apparent carbon content, less than zero, is due to a rather complex picture which may include the presence of oxygen, both dissolved and combined, in the structure of the element 12. Regardless of the cause, it has been found that the apparent minimum carbon content remains at a constant value and that value is reproducible for the atmosphere of hydrogen.

It will now be assumed that the carbon-reducing atmosphere for the furnace 10 of Fig. 1 will be of the CO and $CO_2$ type, and that that carbon-reducing atmosphere can be changed from a carbon-removing character to one which will oxidize the metal of the sensitive element 12. Since the nature of the carbon-reducing atmosphere has been assumed, the reproducible point on the carbon-resistance curve for the filamentary metal 12 will be 0.04% C. Since that scale-point is reproducible and known, and inasmuch as experimental verification has been had of the fact that the per cent change of resistance with change in carbon content of the filamentary metal will be the same for all filamentary-sensitive elements, which may differ dimensionally, it becomes possible to provide a measuring network which can be readily brought into calibration for any given sensitive element of the same composition exclusive of carbon but which may dimensionally differ from other sensitive elements. In the measuring system of Fig. 1, the slidewire 14 is provided with a scale 14a which is calibrated in terms of the carbon content of the element 12. The resistors 18 and 19, together with the resistor 17 and the slidewire 14, have values which predetermine the relative movement between slidewire 14 and its contact to correspond with the calibration of the scale. If the slidewire 14 and its contact be relatively adjusted until the contact occupies a position opposite the 0.04% C. scale-point, and the carbon content of the element 12 has been reduced to its reproducible minimum value of 0.04% C., the system may be brought into calibration by relative adjustment between slidewire 26 and its contact since the effect of that adjustment will be to transfer resistance to or from the arm including the resistor 20 to bring the upper two arms of the Wheatstone bridge network to the same ratio as that established between the two arms including the resistors 18 and 19. The measuring system is brought into calibration at a time when the resistance of the filamentary metal 12 is at an unknown but temporarily fixed value. Thus having established the known reproducible scale-point on the resistance carbon-content curve of element 12, the measuring system 10 may be relatively simple and the adjustments readily accomplished without reference to standards to be connected into the network or to other complications such as laboratory techniques which have heretofore been utilized to accomplish standardization.

With the above understanding of the measuring network, the standardizing operation is initiated by momentarily depressing the push button 40 to complete an energizing circuit from a supply line 41 for the operating coil 42a of a relay 42, which circuit extends from coil 42a by way of conductor 43 and resistor 44 to the other supply line 45. The relay 42 closes its contacts 46 to complete a holding circuit for its operating coil 42a and also closes its contacts 47 to energize a signal lamp 48, the operating coil 49 of a valve 50 and a timing motor 51.

Figure 4:
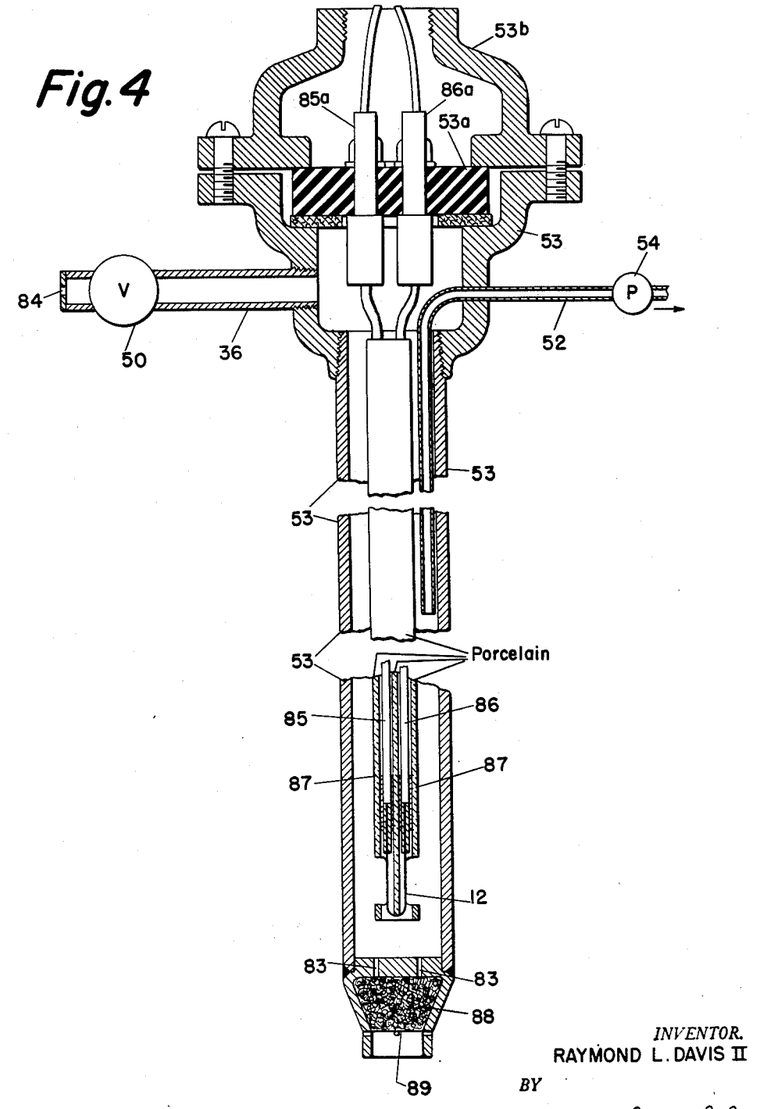
Fig. 4 is a fractional, sectional elevation of the detecting device, its housing, and certain of the flow connections thereto.

The valve 50 is operated to open position to admit air through pipe or conduit 36 to the housing 53 containing the sensitive element 12. The housing 53 is normally connected by the downwardly extending end of conduit or pipe 52 to a suction pump 54 which draws from the lower end of housing 53 a sample of the gas from within the carburizing furnace 10 for intimate contact with the element 12 while both the element and the sample of gas remain at the temperature of the furnace atmosphere. The structural arrangement of the housing 53 and the element 12 therein is shown in Fig. 4 and will later be described.

After opening of valve 50 and during calibration, the suction pump 54 continues its operation in withdrawing gas from housing 53. However, upon the opening of the valve 50, the flow of air through pipe 36 into housing 53 largely takes the place of the in-flow of gases from the furnace through restrictions provided in the lower end of housing 53. The air, at a low and controlled rate of flow, upon entering the upper end of the housing diffuses past the end of the small tube inlet and also diffuses downwardly through the very slowly moving heated gas in the hot end of the housing. The entering air is thus heated and reacts with the gas and lowers its carbon potential. The rate of admission of air, as by adjustment of valve 50, is controlled to allow the atmosphere to attain a maximum carbon-removing character over a period of time adequate to fully decarburize the filament 12, that is, to reduce its carbon content to its minimum reproducible value. The rate of air flow is low enough to insure little, if any, change in the temperature of the atmosphere within the housing 53. Since heat is added by disposition of housing 53 in the furnace 10 at a temperature of 1600° F., the decarburizing atmosphere and the element 12 are maintained at all times above the critical temperature of the element 12.

After an initial, relatively short interval of admission of air to the housing 53, as of the order of a minute, the contacts 55 of the timer 51 close partially to complete an energizing circuit when when completed, as will be later described, serves to initiate calibration. The delay in completing the foregoing circuit is provided to insure that the calibrating operation cannot be initiated upon initial introduction of the decarburizing atmosphere and not until after decarburization of the element 12 has been initiated and the trend of the resistance change is definitely downscale.

During the foregoing operations, particularly the removal of carbon from the element 12, the detector and drive 15 continues to function, and there will be recorded on the chart 23 a record indicative of the decreasing resistance and carbon content of the element 12. Meanwhile, a traveling nut 56 carried on an extension of the shaft 32 of the drive 15 is moving downscale as in the lefthand direction. A limit switch 57 may be closed by the traveling nut 56 engaging the lower end of a crank arm 58 to initiate the calibrating adjustment as the pen and indicator 22 arrives at the end of the scale of chart 23. However, it is to be anticipated that calibration will ordinarily take place before the traveling nut 56 reaches crank arm 58. The traveling nut 56 has been diagrammatically indicated in Fig. 1 to be in frictional engagement with a carriage 59 supported by rollers 60 for slidable movement in either direction. As the nut 56 is moving to the left, the carriage 59, as shown, is moved against a stop 61. However, upon reversal of movement of the nut 56, that is, to the right, the frictional engagement with carriage 59 moves it to the right and, thus, rotates a crank 62, pivotally connected thereto, in a counterclockwise direction to close the calibration-initiating contacts 63.

During the foregoing operations, the record on the chart 23 will, of course, show the gradual diminution of the carbon content within the sensitive element 12 until it attains its minimum reproducible value after which there will not be further change in the carbon content or of the electrical resistance of element 12 for an interval of time.

Figure 2:
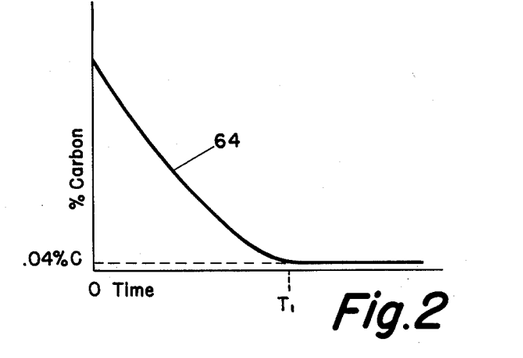
Figs. 2 and 3 are graphs explanatory of the operation of the invention.
Figure 3:
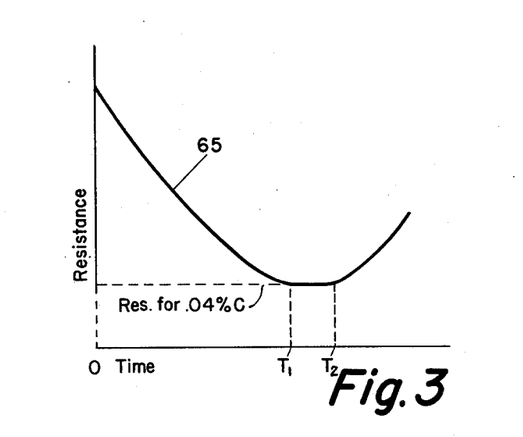

Figs. 2 and 3 graphically illustrate what takes place for the CO, $CO_2$ system. It will be observed that the graph 64 of Fig. 2 indicates that the per cent of carbon content of the element 12 reaches a minimum value of approximately 0.04% C. The resistance of element 12, as shown by the graph 65 of Fig. 3, also reaches a minimum value corresponding with the 0.04% C. The resistance remains at that minimum value for a short interval of time and then the resistance rises but the carbon content is not further reduced.

The reversal in sign of the resistance change is a useful indication that the decarburizing action has been completed. No further removal of carbon will occur though the CO, $CO_2$ equilibrium continues to shift in the carbon-removing direction until capable of oxidizing the ferrous metal filament 12. The time interval between the decrease of the resistance curve to its reproducible value followed by the increase in resistance may be explained by considering the nature of the atmosphere which surrounds the element 12 during decarburization. As the air commingles with the atmosphere and is diffused about the element 12, there will be present both carbon monoxide, CO, and carbon dioxide, $CO_2$. At the beginning of the decarburizing operation, it will, of course, be understood that the housing 53 contains the carburizing atmosphere of the carburizing furnace 10. At that time there is a high ratio of carbon monoxide with respect to carbon dioxide. However, as air enters the housing 53, the carbon dioxide content of the atmosphere within the housing 53 increases and the carbon monoxide content decreases. The air entering housing 53 slowly diffuses through the carburizing atmosphere to form with the carbon, carbon dioxide. The diffusion process is controlled by the flow rate of the air so that in the region of element 12 the atmosphere comprises fully reacted gases, all oxygen of the entering air having combined with the carbonaceous compounds to reduce the carbon potential of the atmosphere around element 12.

Figure 6:
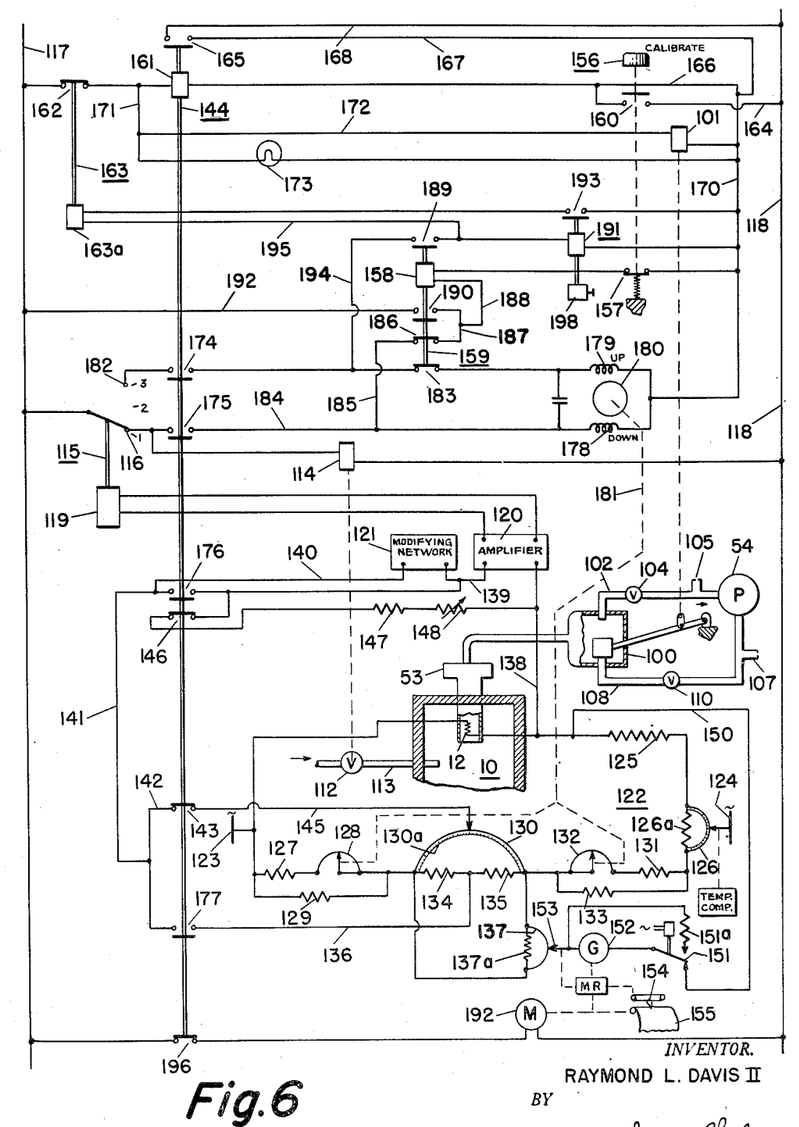
Fig. 6 is a circuit diagram including structural features of a further and preferred modification of the invention.

The reduction of the carbon potential of the atmosphere may be made at a predetermined rate by taking advantage of the precise nature of the laws of diffusion, so that with a proper setting of valve 50 the decarburization extends over an optimum length of time, giving carbon time to diffuse from the center to the surface of the wire for reaction with the atmosphere, but not consuming an unreasonable length of time. A few preliminary trials will indicate the proper setting of valve 50, the degree to which it will be opened by coil 49, to produce complete decarburization of element 12 in the optimum time. For the said wire size, No. 40 A. W. G., and said operating temperature of 1600° F., 5 to 10 minutes will be required. If the flow rate of the air be too high, a minimum resistance will be attained but not necessarily corresponding with the reproducible minimum resistance attained at about 0.04% C. If the flow rate of air into the housing 53 be so low as to require more than ten minutes, the time for calibration is undesirably prolonged though the reproducible minimum carbon content could be attained if in the total period an adequate volume of air were introduced into housing 53. In the modification of Fig. 6, flow rates of 0.05 cubic feet per hour to 0.1 cubic feet per hour have been used and found satisfactory though it is to be understood such rates are to be taken as suggestive. For the modification of Fig. 1 higher rates of flow of air would be necessary since some carburizing gases from furnace 10 enter housing 53 during decarburization but principally because a part of the entering air passes directly to exit pipe 52 and only a part diffuses downwardly to element 12. The optimum time for wires of smaller diameter will be less than for wires of larger diameter, the time of 5 to 10 minutes being for the No. 40 A. W. G. wire. For example, the time increases with the square of the diameter. Thus, for a No. 30 A. W. G. wire, the time would be about 9 times that for a No. 40 and for a No. 50, about one-ninth the time required for the No. 40.

As the ratio of $CO_2$ to CO increases, the carburizing potential decreases. During decarburization as indicated from zero time to time $T_1$ of Fig. 2 the atmosphere about element 12 is of a protective chemical nature (that is chemically reducing) though capable of removing carbon therefrom. As the $CO_2$ to CO ratio continues to rise, there is a change from a chemically reducing atmosphere to a chemically oxidizing atmosphere toward the iron. This change occurs subsequently in point of time, as at $T_2$, Fig. 3, to the attainment, as at $T_1$, of minimum carbon content in the element 12. Thus, the oxidizing reactions for carbon in iron and for the iron itself are not overlapping, but on the contrary, are discontinuous. Thus, after the termination of a time interval, as from $T_1$ to $T_2$, the oxidizing reactions with respect to the iron itself tend to reduce its diameter and thus initiate an increase in its resistance.

As the indicator and pen 22 are moved toward the lower end of the scale to indicate the gradual reduction in carbon content and resistance of element 12, a corresponding relative adjustment is made between the slidewire 14 and its contact to maintain the system in balance as the carbon content is reduced.

If the system has been previously calibrated for a particular sensitive element 12 and there has not been any deviation in the resistance of the element 12 due to change in diameter of the wire or due to metallurgical changes and the like, the relative adjustment of the slidewire 14 with respect to its stationary contact will continue until the carbon content of element 12 attains its reproducible minimum content. At that time, $T_1$ of Fig. 2, the pen and indicator 22 will be at the 0.04% C. point on the scale and the relative adjustment of slidewire 14 and its contact will correspond with the 0.04% C. point on scale 14a.

From the foregoing, it will be seen that the system may be manually calibrated by observing the record on the chart 23 which will in general correspond with the graph shown in Fig. 3. Thus, after the record indicates a minimum value of carbon over a period of time, it will be known that the carbon content of the element 12 cannot be further reduced. If then the pen and indicator are not at the value corresponding with 0.04% C., the calibrating slidewire 26 is adjusted until the pen and indicator have been moved to the calibrating value of 0.04% C. Advantage can also be taken of the fact that the resistance after a time interval rises and as soon as this reversal of trend is noted, the observer can be doubly sure that minimum carbon reduction has been attained and calibration should be undertaken.

In Fig. 1 there has been illustrated automatic calibration of the system and as already indicated, there has been diagrammatically illustrated the manner in which advantage is taken of the rise in resistance of the element 12 following the reduction of its carbon content to its minimum value to close contacts 63. Thus, the traveling nut 56 after having been moved to the left for a considerable distance reverses its direction of movement and as it moves to the right, moves the carriage 59 to rotate the crank 62 to close the contacts 63. The latter contacts are connected in the circuit which was partially completed by the closing of timer contacts 55 operated by the timer motor 51. The completion of that circuit energizes the operating coil 66a of a relay 66, the circuit being completed through resistor 67. The relay 66 closes its contacts 74 to complete its own holding circuit, and closes contacts 68 to energize the coil 69 which operates its armature 70 to move the gear or element 29 of the calibrating slidewire into driving engagement with the gear 31 carried by the shaft 32. The energization of the coil 69 also operates through linkages 71 and 72 a transfer switch 73 to change the connection of the detector and drive 15 from the upper branch of the balanceable network to a point in the lower branch between resistors 33 and 34.

If at the time of transfer the resistance of element 12 corresponds with a scale reading of 0.04% carbon, the lower balanceable network will be in balance and there will not be any movement of the calibrating slidewire 26. However, if the scale reading should be either above or below 0.04% carbon, the network will be unbalanced and the detector and control drive 15 will immediately operate in the correct direction to move the slidewire 14 relative to its contact to bring the network comprising the lower branches into balance. The detector and drive 15 simultaneously rotate the element 29 to drive through connection 28 the calibrating slidewire 26 to move it an amount corresponding with the movement of the slidewire 14, which movement of slidewire 14 is needed to rebalance the network comprising the two lower branches.

The resistance of the two lower branches of the network is high relative to the resistance of the upper branch of the network. Such provision is made in order that the adjustment of the calibrating slidewire 26 will not change to any perceptible degree the resistance of the two lower branches of the network which would otherwise interfere with the range of slidewire 14. More particularly, the resistance of the upper branch including the element 12, the slidewire 13, the resistor 20 and the slidewire 26 may be of the order of 15 ohms, while the resistance of each of the two lower branches of the network may be of the order of 150 ohms, the stated values being suggestive and not by way of limitation.

By way of further illustration, for a range of scale values of from minus 0.12% C., to plus 1.20% C., resistors 18 and 19 may each have a resistance of 75 ohms, the shunted value of slidewire 14 and resistor 17 being 2.3 ohms, and the resistors 33 and 34, respectively, each having resistance values of 97.74 to 100 ohms. At the reproducible scale point of 0.04% C., the arm including the resistor 18 will have a resistance of 75.28 ohms, while the arm including the resistor 19 will have a resistance of 77.02 ohms. The resistors 33 and 34 have values to produce the same ratio of resistance as the foregoing ratio between the arms including resistors 18 and 19. Thus, any selected values may be utilized, such, for example, as a resistance of 97.74 ohms for the resistor 33 and a resistance of 100 ohms for the resistor 34.

Inasmuch as adjustment of the calibrating slidewire 26 depends upon the extent of adjustment of the slidewire 14, it is to be understood that both slidewires will be suitably designed for correct adjustment of the circuit. Since the resistance change of element 12 is substantially linear with respect to its carbon content, there is provided substantially linear change of resistance with adjustment of the slidewire 26 with respect to the extent of adjustment of slidewire 14.

If it be assumed that a new element has been inserted in the furnace 10, such insertion being readily accomplished by reason of the structural features disclosed in Fig. 4 and which will be later described, a calibrating operation will be immediately initiated by the push-button 40 as soon as sufficient time has elapsed to assure that the temperature of the new element 12 is above its critical temperature. The system will then function as above described until the attainment by the element 12 of its minimum reproducible resistance value. Since this is attained within a time interval which assures that its carbon content has been reduced to the above-mentioned reproducible value, a calibrating adjustment of the system may then be made in the event the 0.04% point on the scale 14a has not been attained (or the pen and indicator 22 does not show the same point on the scale of chart 23).

It is an important aspect of the present invention that for any sensitive element of a given material the carbon content can be reduced to the reproducible minimum level and that the resistance of such element will vary with the addition of carbon thereto in the same manner as all other elements of the same material. Accordingly, with this known reproducible minimum point on the resistance-carbon characteristic curve, the measuring system can be calibrated by the attainment of the minimum reproducible value and without resort to further standards of any kind. Accordingly, if for the new element 12 the scale point of 0.04% C. is not attained, the calibrating slidewire 26 is relatively adjusted with respect to its contact until the scale point of 0.04% C. is attained.

With the automatic arrangement which has been described above, the transfer switch 73 is operated at the time $T_2$ and there is automatic adjustment of slidewire 26 relative to its contact to correct for the assumed and indicated deviation from the scale point of 0.04% C.

It is to be further observed that upon the closure of contacts 63, an energizing circuit is completed by way of contacts 55 for timer motor 76 which serves after a predetermined interval of time, such, for example as a half-minute, to close its contact 77. This circuit may be traced from supply line 41 by way of contacts 63, contacts 55, conductor 78, timer motor 76, and by way of conductor 79 to the other supply line 45. The time interval selected is adequate for completion of the balancing of the network comprising the lower two branches.

Again referring to the relay 66, upon energization thereof, the resulting closure of its contacts 75 deenergizes the relay 42 by short-circuiting its operating coil 42a. However, the supply lines 41 and 45 are not short-circuited since the resistor 44 is in series-circuit relation with the operating coil 42a. The relay 42 opens its contacts 47 to deenergize the timing motor 51 which thereupon opens its contacts 55. The opening of contacts 55 transfers the energizing circuit of coil 66a to its holding-in contacts 74. After expiration of the selected time interval, the contacts 77 close to deenergize the relay 66 by short-circuiting its operating coil 66a, the resistor 67 being provided to prevent short-circuiting of the supply lines.

Accordingly, the relay contacts 68 open to deenergize the magnet coil 69 to return the transfer switch 73 to the position shown in Fig. 1 and to disconnect the element 29 from the driving gear or element 31. A spring 80 may be provided to assure the return of the transfer switch and of the element 29 to their illustrated positions. The system again functions to measure the carbon content of the element 12.

The system of Fig. 1 includes provisions to guard against the possibility that the contacts 63 do not close within a predetermined time interval. That eventuality might arise in the event of a continuing reduction of the resistance of the element 12 to a value which results in the movement of the nut 56 to its limiting position, at which point it engages the crank arm 58 to close the contacts 57. These contacts, it will be observed, will complete the same energizing circuits as did the closure of contacts 63. Accordingly, the relay 66 will be energized as well as the timer motor 76. Thus, the foregoing operations will be carried out after their initiation by the closure of contacts 57 including the final adjustment of the slidewire 26 and the return of the system to normal operation.

Should the operation be such that neither contacts 57 nor contacts 63 be operated to a closed position after a relatively long interval of time, longer than would ordinarily be required for full decarburization of the element 12, the timer motor 51 closes its contacts 81 to energize the relay coil 66a and the timing motor 76 to initiate the calibrating operation. After it is completed, the timer motor 76 closes its contacts 77 to deenergize the operating coil 66a of relay 66 which opens its contacts 68 to deenergize coil 69 to return the system to normal operation. The operations as a result of the excessively long time interval are desirable safety features, particularly when the element 12 is utilized automatically to control the carbon potential in furnace 10. The calibrating adjustment will not be correct if the abnormal condition is present.

With the foregoing understanding of the operation of the system as a whole, reference will now be made in more detail to certain structural features of the housing 53 of the element 12.

It will be observed from the sectional view of Fig. 4 of a typical embodiment of the invention that the pipe or conduit 52 extends from the suction pump 54 through the housing 53 and downwardly for a substantial distance within the tubular housing for the sensitive element 12. On the other hand, the conduit or pipe 36 extending from the valve 50 terminates at the interior wall of the housing 53. In operation, the opening of the valve 50 produces a preferential flow of air through the pipe 52 by reason of the provision of the flow-restrictions or orifices 83 in the substantially closed lower end of the housing 53. Air entering the upper part of housing 53 diffuses through the slowly moving gas in the lower hot end of the housing 53, reacts with the gas and lowers its carbon potential. While other gases enter into the carbon-removing reactions, the ratio of the carbon dioxide to the carbon monoxide may be relied upon as indicating and as a measure of the effectiveness of the carbon-removing atmosphere. The normal flow of furnace gas through the lower end of the housing is not altogether suspended. Oxygen introduced through the admission of air can only reach the detector by filtering through the counterflow of gas molecules largely from the carburizing atmosphere of the furnace. Thus, there will be many collisions between the oxygen or oxygen-bearing molecules and the reducing molecules. The result will be that the sensitive element 12 will be contacted only by a thoroughly reacted gas. The admission of air may be controlled by an orifice 84 of a size to allow the atmosphere to remain of a carbon-removing character long enough to fully decarburize the filament before oxidation of the iron can set in.

While reference may be had to said Patent No. 2,541,857 for details of construction of the sensitive device 12 and the construction of the support for the sensitive device 12, it is to be here observed that the wire comprising the sensitive element 12 is shown as attached to two conductors 85 and 86 and extends as a simple loop from their lower ends through the open exposed areas of an electrically insulating ceramic refractory support 87, which may be porcelain. It has been found that the sensitive element 12 can be relatively short and of very fine wire and that it will function quite satisfactorily. The somewhat longer wire disclosed in said copending application, while satisfactory, need not be used, but if used, a wire of smaller diameter than the No. 30 A. W. G. there disclosed would be preferred in accordance with the present invention.

It is to be further observed that the lower end of the housing 53 terminates in a bell-shaped chamber wider at the upper end than at its mouth for retention of manganin wool 88 which serves to protect the element 12 against admission of air or other oxidizing gas during the periods of shut-down of the furnace 10. Retaining wires 89 may be extended across the lower end of the bell-shaped end of housing 83. The upper end of housing 53 is closed by the electrical insulating block 53a held in place by the fastening screws of a terminal flange 53b threaded to receive connecting tubing (not shown) for lead wires extending from terminals 85a and 86a. Substitution of one sensitive element for another is readily accomplished by removing flange 53b and dropping a replacement element in place of the one shown supported by the block 53a, the elements being built as replacement units.

While mention has already been made that the sensitive element 12 may be of a filamentary metal of the type disclosed in said Finch patent, or of a ferrous nickel alloy, or of substantially pure iron, it is to be understood that the selection of one or the other alloy may be dictated by the operating requirements of the furnace. More particularly, if it is desired to carburize articles, heretofore referred to as the work, at a temperature below 1600° F. or to protect them from decarburizing during heat treatment, and during cooling after carburization, the filamentary ferrous nickel alloy will be preferred inasmuch as the critical temperature of that alloy is much below that of the alloy of said Finch patent. It has already been stated that the calibrating-decarburizing cycle should be conducted, and certainly concluded above the critical temperature of the filamentary metal of the sensitive element. Consequently, the decarburizing temperature for the ferrous nickel alloy can be much lower than the indicated 1600° F. for the alloy of the Finch patent, so long as it is above the critical temperature. In general, a ferrous nickel alloy will be preferred having 5% nickel, the remainder iron plus minor percentages of other materials. A typical composition which has been found satisfactory is as follows:

| Composition: | Per cent |
| --- | --- |
| Nickel | 4.99 |
| Silicon | 0.18 |
| Manganese | 0.14 |
| Carbon | 0.04 |
| Residuals | Less than 0.10 |
| Iron | Balance |

The composition of the sensitive elements including the residual materials, those other than iron and nickel, should remain the same for all sensitive elements which are to be utilized in substitution one for the other in a given measuring network. As long as the composition of a plurality of sensitive elements 12, used in a given measuring network, is the same, it is not of material importance what the composition of the ferrous filament 12 may be since the scale and network will be calibrated for the particular composition used.

With the above understanding of one form of the invention, reference will now be had to a preferred modification of the invention which includes features which may be useful in connection with the modifications of Figs. 1–4. For example, in Fig. 5 there is provided a three-way valve 100 operable by a solenoid 101 for selective application from the suction pump 54 of suction or of positive pressure to the housing 53 enclosing the sensitive element 12. The valve 100 is illustrated in its normal position connecting the interior of housing 53 to the conduit 102 which leads to a flow meter 103, the flow being through a suction-control valve 104 and thence to the inlet of the suction pump 54. A valve 105 provides a restriction in an inlet line for flow of air into the inlet of the suction pump. The inlet of air through the valve 105 is beneficial in keeping the pump 54 properly lubricated by reason of the larger flow of gas therethrough.

Figure 5:
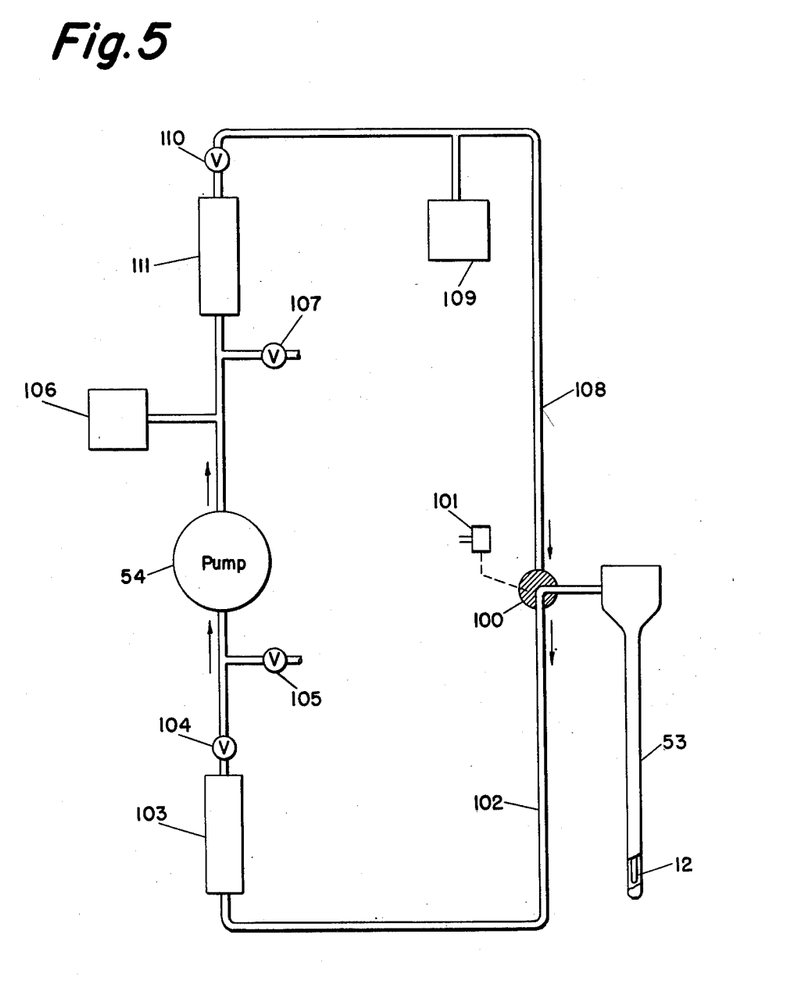
Fig. 5 diagrammatically illustrates the fluid-flow diagram forming a part of the invention.

On the discharge end of the pump 54 there is provided a connection to a surge tank 106 and an outlet through a restriction provided by the valve 107. During calibration, as will be hereinafter explained, the solenoid 101 is energized to connect the discharge end of the suction pump in communication with the housing 53 by way of the conduit 108 which is in flow-communication with a surge tank 109 and is connected through an air-control valve 110 and through a flow meter 111 to the discharge side of the suction pump. Accordingly, during calibration the suction pump 54 delivers air at a predetermined rate to the protection tube or housing 53. Only a slight pressure is built up in the system. The surge tanks 106 and 109 serve to insure steady flow of the gases and reduce pump pulsations. The removal of suction from the housing 53 by operation of valve 100 effectively terminates flow of furnace gases into the housing.

Since there is initial pressure on the discharge side of the suction pump, as soon as the valve 100 connects the housing 53 to the line 108, there is an initial surge of air from the tank 109 which helps to overcome the time lag which would otherwise occur in diluting the furnace-gas atmosphere within the housing 53. After the initial surge, the air flow is maintained at a relatively low rate, as of the order of 0.05 cubic feet per hour, as indicated on the meter 111.

The rate of flow of the air is made sufficient to decrease progressively the carbon potential in the vicinity of the sensitive element at a rate which the element can follow; that is, a rate not greater than that at which the carbon may be removed from element 12.

As in the earlier modification, it is not intended that the air itself shall reach the sensitive element but rather shall react with the atmosphere at some distance from it to decrease the carburizing potential. In both cases the sensitive element is only subjected to a thoroughly reacted gas. As in the case of the earlier modification other gases as hydrogen and water vapor may be used to produce the constituent-removing or decarburizing atmosphere.

In Fig. 6, the suction pump 54 has been illustrated in simplified flow connections though they are to be taken as representative of Fig. 5. They include the outlet restriction 107, the inlet restriction 105 together with the flow-control valves 104 and 110 together with a three-way valve 100.

The modification of Fig. 6 differs from Fig. 1 in a number of respects other than the foregoing modifications of the flow control system connected with the housing 53. For example, in Fig. 1 the calibrating slidewire 26 was adjusted after reduction of the carbon content of element 12 to its minimum reproducible value. Thereafter such adjustment of the calibrating slidewire 26 was made as was necessary to move the indicator 22 to the scale point corresponding with the minimum reproducible carbon content of the element 12. In contrast with Fig. 1, the arrangement of Fig. 6 is such that the calibrating slidewires 128 and 132, upon initiation of the calibrating operation, are adjusted to positions to balance the measuring network. After the carbon content of the element 12 has been reduced to its minimum reproducible value, the calibrating slidewires remain in their final positions. For such final positions the measuring system is in proper calibration for accurate measurement of the carbon potential of furnace 10.

In both Fig. 1 and Fig. 6, the shift in resistance from one arm of the bridge to another compensates for different absolute values of resistance of element 12, or of different elements of the same composition. Thereafter, the per cent of change of resistance, or per cent of unbalance of the network will be the same for elements whose absolute values of resistance differ at the reproducible scale-point.

It is to be further noted in Fig. 1 that the adjustment of slidewire 13 also serves to change the ratio of resistance between the arms including element 12 and resistor 20 to correct for temperature changes of the element 12. Hence, any unbalance of the network will be due to change in carbon content of element 12 and not due to change of temperature or to dimensional changes of element 12. Advantage is also taken in the system of Fig. 6 of an increase in the resistance of the sensitive element 12 following reduction of its resistance to its minimum value to terminate the calibrating operation.

With the foregoing introductory explanation, the system as a whole will now be described together with other elements and features of operation. Assuming that the carburizing furnace 10 is functioning in normal manner to carburize work supported therein, it will be seen that a control valve 112 is effective under the control of its operating coil 114 to regulate the admission of the carburizing agent through the conduit 113 to the furnace 10. The coil 114 is energized whenever the relay 115 completes a circuit through its lower contacts 116, the energizing circuit completed being readily traced from supply line 117 to supply line 118. The relay 115 may be moved to any one of three positions indicated by the small numerals 1, 2 and 3. The spacing of contacts 116 and 182 has been exaggerated in Fig. 6, since in practice they will be relatively close to each other. Energization of the operating coil 119 of the relay 115 is under the control of an amplifier 120, a modifying network 121 and a measuring network 122.

It will be observed the measuring network 122 is energized from alternating current supply lines 123 and 124 and comprises a balanceable network of the Wheatstone bridge type in which the sensitive element 12 is connected in one arm with a resistor 125 connected in another arm together with a part of a temperature-compensating slidewire 126, shunted by resistor 126a and provided with a temperature scale. Included in a third arm of the bridge are a resistor 127, a calibrating slidewire 128, and a shunting resistor 129 together with a part of a slidewire 130. In a fourth arm of the bridge is the remaining part of the slidewire 130 and a circuit-assembly similar to that in the third arm comprising a resistor 131, a calibrating slidewire 132 and a shunting resistor 133. The slidewire 130 is provided with two resistors 134 and 135 connected between the respective ends thereof with a conductor 136 leading to the juncture of said resistors. In shunt with slidewire 130 is a further slidewire 137.

Before discussing further circuit details it will be helpful to note that the alternating current amplifier 120, of any suitable type, has its input circuit connected to a diagonal of the bridge, conductor 138 leading to the juncture between sensitive element 12 and resistor 125. The other input conductor 139 leads to the modifying network 121 and by way of conductors 140, 141 and 142, contacts 143 of a relay 144, and conductor 145 to the contact of slidewire 130. Connected in shunt across the input circuit of the amplifier 120 is a current path including contacts 146 of relay 144, a resistor 147 and a variable resistor 148 which is provided to vary the sensitivity of operation of the relay 115.

The relative position between the slidewire 130 and its contact determines the carbon potential which is to be maintained within the furnace 10. An associated scale 130a may be calibrated in terms of carbon-potential. For a particular control point the bridge or network 122 will be in balance for a corresponding value of resistance of element 12. When there is deviation, the change in the resistance of the element 12 will unbalance the bridge and there will be an input signal applied to the amplifier 120 which will operate the relay 115 to change the delivery of carburizing agent to the furnace 10. Though there may be provided continuous position control of the valve 112 (as in Davis Patent 2,300,537), there has been illustrated the modifying network 121 which serves by providing an interrupted measuring-bridge signal to control the duration and time of opening of valve 112 in manner to insure maintenance of the desired carbon potential within the furnace 10 at its selected value. More specifically the network 121 controls the ratio of the open-time to closed-time of the valve 112. For details of the nature of the modifying network 121, reference may be had to Davis Patent No. 2,325,232 which discloses a system which is known to those skilled in the art as of the "Duration Adusting Type."

It is to be observed that the network 122 includes a further connection from the juncture between element 12 and resistor 125 as by conductor 150, thence through a vibrator 151, preferably polarized and operating at the same frequency as the supply lines 123 and 124, for half-wave rectification of the alternating current for operation of a galvanometer 152 connected to contact 153 of the slidewire 137. The resistor 151a is included so that the galvanometer 152 is not open-circuited during the time the vibrator is rejecting half-waves of one polarity. The galvanometer 152 may comprise one element of a mechanical relay mechanism, such as shown in Squibb Patent No. 1,931,732, which mechanism is designated in Fig. 6 as "MR" and as disclosed by the broken lines drives the pen and indicator 154 of a recorder for producing a record on a chart 155 and relatively adjusts the slidewire 137 with respect to its contact 153. Thus, relative adjustment between slidewire 137 and its contact 153 rebalances the subsidiary network and is effective to produce a record on the chart 155 of change in the resistance of element 12 without affecting, as by unbalancing or balancing, the network 122. Of course, the chart 155 is preferably calibrated in terms of the carbon potential of the atmosphere of the furnace 10.

In normal operation the relay 115 opens and closes to open and close the valve 112 at a rate which insures the maintenance of the carbon potential within the furnace 10 and the recorder and indicator, 154—155, give a direct indication and record of the carbon potential that is being maintained. During the normal control operations the relay 115 operates from its closed #1 position to its open #2 position. It is not energized to move to its #3 position and should it be, nothing would happen as the result thereof.

In the foregoing description it has been assumed that the calibrating slidewires 128 and 132 occupied fixed positions for calibration of the network 122 in terms of the reproducible minimum carbon content to which the element 12 may be reduced. Since, as before explained, the calibration of the detector may change, it is desirable automatically to recalibrate the network.

The calibrating operation can be initiated either automatically at predetermined intervals or, as shown, by manually momentarily operating a push-button switch 156 which opens its contacts 157 to prevent immediate energization of the operating coil 158 of a relay 159 and closes its contacts 160 to complete an energizing circuit for the operating coil 161 of the relay 144 which may be traced from supply line 117 by way of contacts 162 of a relay 163, the operating coil 161, contacts 160 and by conductor 164 to the other supply line 118.

The relay 144 immediately closes its contacts 165 to complete its own holding circuit which may be traced from conductor 117 through contacts 162, the operating coil 161 and by conductors 166 and 167, contacts 165, and conductor 168 to the other supply line 118. A number of additional circuits are also completed by closure of contacts 160 and held completed by closure of contacts 165, the multiple function of said contacts being indicated by the single conductor 170 which is directly connected to conductor 167. First, there is completed by way of conductors 171 and 172 an energizing circuit for the operating coil 101 of the three-way valve 100 which is effective to close the connection between the conduit 102 and the conduit leading to the housing 53 and to open the connection between that housing and the pipe or conduit 108 leading to the outlet or high pressure side of the suction pump 54. There is an immediate in-rush of air to the housing 53 which is adequate to initiate decarburization of the sensitive element 12. When the coil 101 is energized, there is also completed an energizing circuit for a signal lamp 173 which indicates that the calibrating operation has been initiated.

Again referring to the relay 144, it will be observed that as its contacts 165 were closed its contacts 174, 175, 176 and 177 close, while its contacts 143, 146, and 196 open. The closing of the contacts 176 completes a by-pass circuit around the modifying network 121 effectively taking it out of the amplifier circuit. This has the effect of providing an uninterrupted measuring-bridge signal which is applied to the amplifier and which by operation of the relay 115 may be applied to one or the other of motor windings 178 and 179 of a motor 180 connected to mechanically drive the calibrating slidewires 128 and 132 as indicated by the broken-line connection 181. The opening of contacts 143 and the closing of contacts 177 transfers the circuit from the contact of the control-point slidewire 130 to a fixed point or tap in the circuit. This point or tap, shown between the resistors 134 and 135, corresponds with a point on the slidewire 130 for a carbon potential of 0.04% C., the relative resistances of resistors 134 and 135 being determined for the stated result. This avoids the need manually to operate the slidewire 130 during calibrating operations.

Inasmuch as calibration will rarely, if ever, be initiated with carbon potentials as low as 0.04% carbon, it will be at once understood that the transfer from a control point of slidewire 130 higher than 0.04% C. to the value corresponding with 0.04% carbon will result in immediate and substantial unbalance of the bridge network 122. The resistance of the element 12 will be high compared with its resistance for a carbon content of 0.04%. Consequently, a relatively strong unbalance-signal will be applied to the amplifier 120 which will immediately energize the relay coil 119 to operate the relay to complete a circuit through its upper contact 182. An energizing circuit will then be completed for the motor winding 179 which may be traced from supply line 117, relay contact 182, contacts 174, normally closed contacts 183 of relay 159, the motor winding 179 and by conductor 170 through the contacts 165 to the other supply line 118. The motor then operates to adjust the calibrating slidewires 128 and 132 in directions to reestablish balance.

From the foregoing it will be observed that in the modification of the invention as shown in Fig. 6, the calibrating slidewires are immediately moved to positions to balance the network for whatever resistance and carbon value the element 12 might have at the time the calibrating operation was initiated and corresponding with the control-point setting of slidewire 130.

As soon as decarburization has been initiated, carbon is continuously removed from the element 12 and the network 122 is unbalanced in the opposite sense. Of course, as balance of the network 122 was first attained, it will be understood that the relay 115 opened the circuit through its contact 182 and returned to its mid-position between contacts 116 and 182. Upon unbalance of the network in said opposite direction corresponding with decreasing values of resistance for the element 12, the relay 115 completes a circuit through its contacts 116 to energize the motor winding 178 to drive the calibrating slidewires 128 and 132 in directions to rebalance the network. As momentary balance is attained, the relay 115 opens the circuit through its contacts 116.

As the relay 115 successively opens and closes to energize the motor 180 to maintain the network 122 in balance, there is also completed an energizing circuit for the coil 114 of the valve 112. Accordingly, the valve operates to admit carburizing agent to the furnace 10. While the control of the atmosphere in the furnace 10 may change to some degree, it has been found more desirable to have the valve 112 operated during the calibrating operation than to take it out of service. The entire calibrating operation does not take very long, of the order of 10 minutes, which is relatively short in terms of the total time required for the complete heat treating cycle within the furnace 10. The calibrating operations are preferably carried out at a time when loss of control for a period is of no consequence, as at the start of a cycle or heat treating operation. After calibration, the selected value for the carbon potential within the furnace 10 will be attained and the work will have a final surface carbon content corresponding with the setting of slidewire 130.

It is to be further observed that during calibration upon the first closing of the circuit through the contacts 116 of relay 115, the operating coil 158 of the relay 159 is energized through a circuit which may be traced from supply line 117, contact 116, contacts 175 of relay 144, conductors 184 and 185, contacts 186 of relay 159, conductors 187 and 188, operating coil 158, and by way of contacts 157 to the conductor 170 and thence through contacts 165 to the other supply line 118. The relay 159 thereupon operates to close its contact 189 and 190 and to open its contacts 186 and 183. The opening of the latter contacts prevents further operation of the motor 180 in one direction even though a circuit is completed through the contact 182 of relay 115. The closing of contacts 190 completes a holding circuit for the coil 158 while the closure of contacts 189 partially completes an energizing circuit for the timer relay 191 and the operating coil 163a of relay 163. The holding circuit may be traced from supply line 117 by way of conductor 192, contacts 190, conductor 188, operating coil 158 and by circuit closing contacts 157 to the conductor 170.

With the circuit connections as above described, the carbon removal from the element 12 continues and the downscale winding 178 of motor 180 is intermittently energized to maintain the balancing network 122 in balance. As the minimum carbon level in the element 12 is approached, the rate of decarburization will decrease and when the minimum value has been attained there will be an inactive period which, of course, corresponds with the horizontal portions T1 to T2 of the curves 64 and 65 of Figs. 2 and 3. The calibration of the system is then complete.

However, it may be further observed that upon initiation of, and during, the calibrating operation the recorder 154-155 will not operate by reason of the opening of contacts 196 of relay 144 which denergizes the chart-driving motor 192. A relay (not shown) in shunt with motor 192 also opens the circuit of ganvanometer 152, thus disconnecting the indicator from the system.

The ratio of resistance of the resistors 134 and 135 is selected to produce a circuit balance corresponding with the known reproducible level of carbon of 0.04% in the same way as slidewire 130 when adjusted relative to its contact to a position of 0.04% C. as shown on its associated scale 130a. It therefore follows that the final positions of calibrating slidewires 128 and 132 will introduce a correction into the network which will bring it into calibration corresponding with the carbon content of element 12 of 0.04% C. and the measuring system as well as the indicating and recording instrument, including the galvanometer 152, will thereafter correctly control, measure, and indicate the resistance or carbon content of element 12 and thus, the constituent potential of the atmosphere within the furnace 10.

During the inactive period the atmosphere surrounding the element 12 for the CO, $CO_2$ system changes to one of an oxidizing character. As soon as oxidation begins, the resistance of the element 12 increases. The result is the immediate energization of the relay 115 to an extent adequate to close the circuit through its contact 182. The timer 191 will then be energized and about fifteen seconds later will close its contacts 193. The timer 191 provides a short time delay before return to normal operation to provide maximum assurance that there has been a real reversal in the resistance change of element 12 to avoid termination of the calibrating period in the event of a transient spurious signal which might momentarily result in the completion of a circuit through the contact 182.

It is to be further noted that when the resistance change in element 12 has reversed and is rising, the relay 115 is maintained in its upward position since the energizing circuit for motor winding 179 is open and there can be no further adjustment of slidewires 128 and 132. As soon as the timer contacts 193 close, an energizing circuit is completed for the operating coil 163a which may be traced from supply line 117 by way of contact 182, contacts 174, conductor 194, contacts 189, conductor 195, operating coil 163a, timer contacts 193, and by way of conductor 170 and contacts 165 to the other supply line 118. The opening of relay contacts 162 deenergizes the relay 144, the signal lamp 173, the valve-operating coil 101, and the relay 159, thereby returning the system as a whole to its normal operation; that is, with the component parts in substantially the positions illustrated in Fig. 6.

Prior to the time the calibrating connections are broken, the element 12 has been brought to a known reproducible level of carbon content. The measuring circuit 122 has been balanced by the calibrating slidewires 128 and 132 to correspond with the known reproducible level of the carbon content with the scale 130a in proper calibration. With the response of the measuring system then coinciding with the reproducible low value of constituent or carbon content, the system is in readiness for return to its controlling and indicating functions.

Upon deenergization of coil 101 the valve 100 is returned to the position shown in Figs. 5 and 6, with the housing 53 again in direct communication with the suction side of the pump 54. Consequently, the gas within the furnace 10 is immediately withdrawn into the housing 53 which rapidly transforms the atmosphere therein to correspond with the carburizing atmosphere within the furnace 10. The carbon content of the element 12 soon rises to a value dependent upon the constituent potential of that atmosphere which, of course, is measured and recorded on the chart 155.

Upon termination of the calibrating operation the contacts 196 again close and the measuring instrument (152 and MR) immediately operates to move the indicator and pen 154 to a down-scale position on the chart 155. Thus, the calibrating slidewires 128 and 132 in their final positions correct for any variations of element 12 which would introduce error into the operation of the system 122.

In the particular measuring circuit or balanceable network 122 disclosed in Fig. 6 it is to be noted that there is simultaneous relative adjustment between slidewires 128 and 132 with respect to their contacts; more particularly, the resistance to the left of slidewire 130 is changed in one direction, while the resistance to the right of the slidewire 130 is changed in the opposite direction and by substantially equal amounts. This means that there is no net change of resistance across the lower arm of the network but there is a relative electrical shift in the position of the slidewire 130 in the lower branch of the network either to the right or left of the electrical center thereof. It is in this manner that the adjustment of the calibrating slidewires 128 and 132 serve to bring the network into proper calibration and in manner already described.

The resistance of the upper branch, including a portion of the slidewire 126, is low relative to the lower branch of the network in order to avoid significant changes in the resistance in the lower branch with adjustment of the temperature-compensating slidewire 126. It is to be further noted that the slidewire 137 is connected directly across the slidewire 130. These two slidewires are similar in electrical characteristics and both can operate to rebalance the network. By adding the slidewire 137 it is possible to utilize the balanceable network both for a control system and for a separate indicating and recording system as well.

The measuring and controlling system of Fig. 6 is to be preferred over the system of Fig. 1 for a number of reasons. In Fig. 6 the sensitive element 12 is the sole impedance of one arm of the Wheatstone bridge, and thus at all times the change in impedance, specifically the resistance of that arm of the bridge, with like changes of carbon content of the element 12, will produce the same percentage of unbalance of the Wheatstone bridge. More specifically, there is not included in the arm including element 12 a part of the temperature-compensating resistor 126, since in Fig. 6 it is disposed between two adjacent arms of the bridge and the source of supply, as the supply line 124. In the second arm of the bridge of Fig. 6 there is included the resistor 125 which preferably has about the same resistance as the element 12, though the value of resistor 125 is not critical.

The third and fourth arms of the bridge respectively, include resistor 127, variable resistor 128 shunted by resistor 129, and resistor 131, variable resistor 132 shunted by resistor 133 with the control-point-setting variable resistor or slidewire 130 connected therebetween. This circuit arrangement is highly desirable in that adjustment of slidewires or resistors 128 and 132 electrically shift the slidewire 130 in the network, and relatively large adjustments in the resistance values of the third and fourth arms may be made to compensate for large changes in the resistance of element 12 due to change in wire size, as in the cross-section or length, or both. Nevertheless, the system remains equally accurate and sensitive to change in resistance of element 12 due to change in carbon content because the percentage change in the first arm of the bridge will be the same regardless of the calibrating adjustments made by change in the setting of resistors 128 and 132.

Combined with the foregoing features is the provision of the exhibiting means comprising the pen-indicator 154 movable across a scale which may be that of the chart 155 under the control of a subsidiary network connected in shunt across the slidewire or variable resistor 130. Adjustment of slidewire 137 of the subsidiary network does not change the resistance of any of the arms of the Wheatstone bridge 122.

As above described, the rectified current through the galvanometer 152 relatively adjusts the slidewire 137 and the contact 153 to balance this subsidiary network which includes the connection by way of conductor 150 to the Wheatstone bridge 122.

If the furnace 10 is operating at the control point as determined by the setting of slidewire 130, and the galvanometer 152, and the mechanical relay MR has adjusted the slidewire 137 relative to the contact 153 to balance the subsidiary network, there will be zero current flow through the galvanometer. Hence, there will be absent any current drain from the Wheatstone bridge 122 which would otherwise adversely affect balance thereof. The result is that without disturbing the operation of the Wheatstone bridge the circuit arrangement for the subsidiary network makes possible accurate measurement and recording of the constituent potential of furnace 10 and avoids the need of a separate measuring network.

It is to be further emphasized that by including the sensitive element 12 in a single arm of the bridge, though the same result could be attained by dividing element 12 between two opposite arms of the bridge, a constant percentage of active resistance is maintained effective in the bridge notwithstanding the relatively great changes in resistance sometimes necessary as a part of the calibrating operation. Since the per cent change of resistance with change of carbon content is constant above the known minimum reproducible value, it will be seen that the foregoing feature is of importance in assuring continued accuracy in the measurement of the carbon potential, notwithstanding dimensional changes, whatever their character.

Advantage is also taken in the Wheatstone bridge 122 of the fact that the total range of the resistance change between minimum and maximum positions of slidewire 130 is relatively small. Thus, though the change of resistance with change of the contact relative to slidewire 130 is hyperbolic in character, it is effectively linear between the minimum and maximum limits of adjustment, that is, linear to such degree that the hyperbolic aspect thereof does not appear during operation with respect to the linear scale 130a.

Though the resistance change for element 12 is linear and the resistance change for slidewire 126 is substantially linear, the change in the adjustment of the bridge due to adjustment of slidewires 128 and 132 is of a hyperbolic character in order that scale 130a will continue to be accurate for relative adjustment of the slidewire 130 relative to its contact, regardless of whether the calibrating resistors 128 and 132 be at one or the other limits of their movement or at any intermediate position.

In a typical embodiment of the invention with a sensitive element 12 and a measuring system for indicating the carbon potential for a change in carbon content of an element corresponding with 400 points (each point being a change of 0.01% C.), the resistor 125 may be 5,840 ohms; the slidewire 126, 20.00 ohms; its shunting resistor 126a, 2.72 ohms; the resistor 127, 135.2 ohms; slidewire 128, 29.07 ohms; the shunting resistor 129, 152.2 ohms; the slidewire 130, 20.00 ohms. The resistor 131 had a resistance the same as resistor 127, namely 135.2 ohms; slidewire 132, 29.07 ohms; the shunting resistor 133, 152.2 ohms. The resistor 134 had a resistance of 0.1068 ohm, while the resistor 135 had a resistance of 3.232 ohms. In the subsidiary network the slidewire 137 had a resistance of 32.23 ohms, with the shunt having a resistance of 52.71 ohms. For a range of carbon from zero to 1.25 the resistance change of a typical sensitive element 12 was from about 6.826 ohms to about 7.294 ohms which, of course, indicates the range of change in resistance from one limit to the other of slidewire 130. The change in resistance of element 12 in absolute values would, of course, change with each adjustment of the calibrating slidewires 128 and 132 due to dimensional changes between various sensitive elements or dimensional changes occurring in a particular element. However, the indicated range of approximately one-half ohm may be taken as generally typical of the range of adjustment of slidewire 130. However, the per cent change of the resistance of element 12 between zero carbon content and the indicated 1.25% C. is of the order of 6.85%.

It is to be understood in connection with both modifications of the invention that the diagrammatic illustrations of certain of the devices are intended to be suggestive primarily of functions performed. For example, the timer 191 has been illustrated in Fig. 6 as operated by a coil under the control of a dashpot 198. A synchronous timing motor or other timing device may be utilized in place of the diagrammatically illustrated arrangement. By way of further example, the timing motors 51 and 76, together with their associated contacts, may be of the type disclosed in Davis Patent No. 2,424,305 and identified therein by the reference characters 70 and 71.

Figure 7:
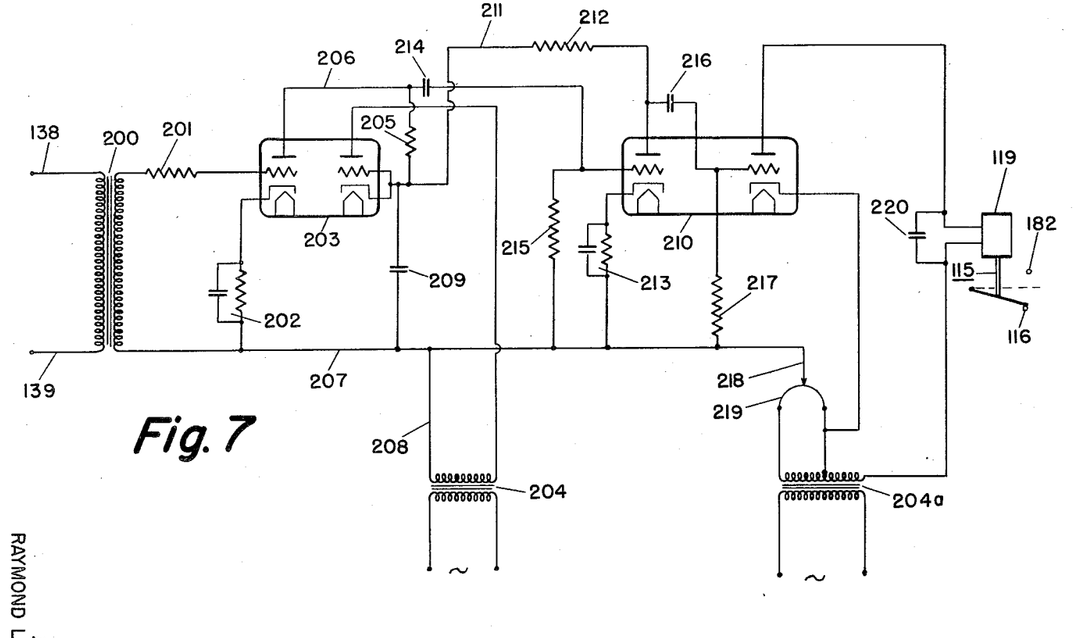
Fig. 7 is a wiring diagram of the amplifier of Fig. 6.

The amplifier 120 may be of several forms known to those skilled in the art, such for example as those shown in copending application S. N. 757,745 Davis, filed June 28, 1947, now Patent No. 2,530,326, by a co-employee of mine. A typical amplifier system of the type shown in said application is illustrated in Fig. 7. The input to the amplifier is illustrated as including the conductors 138 and 139 of Fig. 6 which, it will be observed, are connected to the primary winding of an input transformer 200, the secondary winding being directly connected through a grid resistor 201 and a cathode-biasing resistor and capacitor 202 to the cathode of the first stage of a double-triode tube 203. The second stage of the double-triode 203 serves as a rectifier, the anode being connected to one side of the secondary winding of an alternating current transformer 204, the primary winding being connected to a suitable source of alternating current. Current flow may be traced from one side of the secondary winding of the transformer 204 to the anode, thence by way of the grid and cathode, a load resistor 205, conductor 206, the anode and cathode of the first stage of tube 203, thence through the cathode-biasing resistor and by conductors 207 and 208 to the other side of the secondary winding of transformer 204. A filter condenser 209 is connected between the cathode and the conductors 207 and 208 to smooth out the rectified current.

The anode supply for the first stage of a second double-triode tube 210 is also derived from the foregoing circuit by way of conductor 211, resistor 212 and thence from the anode and cathode of the first stage of tube 210 through the cathode-biasing resistor and capacitor 213 to conductor 207. Alternating current input signals derived from unbalance of the network 122 are applied to the first stage of tube 203, amplified, and through coupling capacitor 214 are applied to the grid of the first stage of the tube 210. A grid resistor 215 is provided for the first stage of tube 210. Amplified signals from the first stage are applied through coupling capacitor 216 to the grid of the second stage of tube 210, a grid resistor 217 also being provided.

The second stage of tube 210 is operated as a grid-controlled rectifier, the anode being connected in series-circuit relation with the operating coil 119 of relay 115 and to the secondary winding of a transformer 204a, which may be a part of transformer 204 or a separate transformer as shown, and energized from the same source of alternating current as the transformer 204. The cathode of the second stage of tube 210 is connected to an intermediate tap on the secondary winding and the grid resistor 217 is connected to conductor 207 which leads to a tap 218 of a slidewire 219 which is connected across an additional few turns of the secondary winding to provide an adjustable bias as between the grid and cathode of the second stage of tube 210. A capacitor 220 is connected in shunt to the coil 119 to smooth out the unidirectional current passing therethrough.

It will be seen at once that relative adjustment of slidewire 219 with respect to its contact 218 will change the magnitude of the unidirectional current flowing through the coil 119. That relative adjustment is such that the armature of relay 115 normally occupies a position midway between contacts 116 and 182 in the absence of a signal at the input transformer 200. The relay may be either gravity or spring-biased to one position, which bias is overcome by the relay coil 119 with zero input signal to the amplifier. Thus, unbalance of network 122 in one direction will produce operation of the relay 115 toward one of its stationary contacts and unbalance of network 122 in the opposite direction will produce operation of relay 115 toward the other of its stationary contacts depending upon whether the output current increases or decreases from the value which maintains relay 115 in its No. 2, or mid-position.

When the modifying network 121 is included, it will be remembered that the relay 115 will be operated between its mid-position and the position in engagement with contact 116 intermittently to open and close the valve 112 in regulation of the mean rate of flow of carburizing agent to the furnace 10 to maintain the constituent potential therein at that value which has been determined by the setting of slidewire 130. Thus it will be seen that the relay 119, in accordance with the present invention, performs the functions of control of the constituent potential as well as the additional functions which have been explained in connection with the calibration of the network 122 in terms of the minimum reproducible carbon content to which the element 12 may be reduced.

Where the carbon reducing atmosphere includes hydrogen and water vapor, it will be remembered the apparent minimum carbon content of element 12 will be a minus 0.05% C. However, the −0.05% C, is a reproducible minimum value, that is, it is a fixed and known point on the carbon-resistance curve. Therefore, it too may be used for calibration of the network. However, slight modifications of the system will be desirable. In Fig. 1, the ratio of resistors 33 and 34 (in Fig. 6 resistors 134 and 135) will be selected for balance of the measuring system for the −0.05% C scale-point. Since the −0.05% C will be to the left of the usual zero point on scale 14a of Fig. 1 (scale 130a of Fig. 6), the slidewires and/or scales will be modified if necessary to provide the range to minus 0.05% C. Thus, in Fig. 1 the location of the lower end of crank arm 58 may be to the left of the position shown to provide for the additional movement required of the nut 56.

In typical embodiments of the invention, the end-points of slidewire 14 of Fig. 1 correspond with a minus 0.12% C and plus 1.25% C, thus providing a fairly wide range on scale 14a for the CO, $CO_2$ system, or the hydrogen water-vapor system of decarburization. The wide range was provided by selection of the values of the circuit elements of the bridge, particularly of resistors 17, 18 and 19. For the minus 0.05% C point, the lower end of the scale would be extended further beyond 0.05% C as by changing the relative values of resistors 17, 18 and 19, of course, changing the ratio of resistors 33 and 34 to establish the balance point corresponding with minus 0.05% C.

In the several modifications of the invention, the calibration is reliable and assures a high accuracy of control and measurement. In this connection, reference has been made to a reproducible minimum carbon content of about 0.04% C.

The accuracy of the system as a whole is usually expressed in terms of the overall accuracy of the carbon deposition or removal process. That is to say, when operating normally and properly, the system will, with good consistency, produce work with a surface carbon concentration within plus or minus 0.05% C. The variations are due to a variety of factors. For example, two pieces of work subjected to the identical carburizing conditions (side-by-side in the furnace) frequently differ in carbon content by as much as plus or minus 0.03% C. Commercial practice does not recognize or require measurements with greater accuracies than plus or minus 0.05% C because of inherent variations and the limitations as to reproducibility of the constituents in ferrous work which affect carburization.

Accordingly, if the reproducible scale-point of 0.04% C for the ferrous alloy of said Finch patent be within the range of 0.02% C and 0.06% C as it has been found to be, the accuracy of the system as a whole fully meets the commercial requirements and is better than the plus or minus 0.05% C.

For the 5% nickel alloy, a reproducible scale-point within the range of 0.06% C and 0.10% C such as 0.08% C is utilized.

Prior to the present invention it was necessary to calibrate the measuring system by laboratory techniques which were not suitable for general commercial practice where those using the carbon-controlling system were unskilled as regards such laboratory techniques. Accordingly, the present invention provides the automatic calibration of the measuring system which is undertaken at the beginning of each heat treating run and maintains the carburizing potential within the furnace at a selected value and holds it there with great accuracy during the heat treatment. Thus, the system is reliable and by reason of the calibration, functions in avoidance of cumulative errors which would otherwise greatly affect the heat treating and/or carburizing operation.

What is claimed is:

1. A measuring system including a filamentary ferrous metal which in the atmosphere of a carburizing furnace uniformly and reproducible changes its resistance with change of carbon content from a reproducible known minimum value, a network of the Wheatstone bridge type having two ratio arms, a third arm including said filamentary ferrous metal and a fourth arm including a circuit element, a variable resistor disposed between adjacent arms of said bridge for establishing with the circuit elements in said adjacent arms operation of said variable resistor in correspondence with calibration of a substantially linear scale associated therewith and calibrated to cover a range of carbon content of said filamentary metal, means including structure for surrounding said filamentary metal with a decarburizing atmosphere independent of said furnace atmosphere for gradually removing carbon from said filamentary metal to reduce the carbon content to said reproducible value, and means for adjusting at least one circuit element of said bridge to establish the same ratio between said filamentay ferrous metal and said circuit element as established between said adjacent arms of said bridge on either side of said variable resistor when moved to a point on its scale corresponding with the carbon content of said filamentary metal at said reproducible value.

2. In combination, a filamentary ferrous metal whose resistance changes with transference in either direction of a constituent common to both said filamentary metal and an ambient atmosphere, a measuring system including said filamentary metal as a circuit element thereof, said measuring system being designed for a predetermined response when the value of the concentration of said constituent in said filamentary metal is at a predetermined minimum reproducible value, means for making the ambient atmosphere of said filamentary metal correspond with an unknown atmosphere whose concentration therein of said constituent is to be measured, said means also being operable without substantial modification of said unknown atmosphere for changing said ambient atmosphere of said filamentary metal to one having an increasing capability of removing said constituent from said filamentary metal, calibrating means including a circuit element for establishing said predetermined response of said measuring system when said constituent in said filamentary metal has been reduced to said minimum reproducible value.

3. In combination, a sensitive element having an electrical characteristic which varies in a known manner with change of a constituent thereof above a predetermined minimum reproducible value, a measuring system including said sensitive element as a component part thereof, at least one circuit element in said system calibrated in terms of the value of the constituent content of said sensitive element, calibrating means for said network including an adjustable circuit element, means for subjecting said sensitive element to an atmosphere capable of removing said constituent from said element independent of the atmosphere whose constituent content is to be measured by said element to reduce said constituent in said element to said minimum value and means for actuating said adjustable circuit element to compensate in said system for variations of said electrical characteristic when said constituent in said element has been reduced to said predetermined minimum value.

4. In combination, a filamentary ferrous metal whose resistance changes with transference in either direction of a constituent common to both said filamentary metal and an ambient atmosphere, a housing for said filamentary metal, flow connections to said housing for introducing an atmosphere having an unknown concentration of the constituent and for changing the concentration of the constituent in the ambient atmosphere surrounding said filamentary metal, a measuring system, including said filamentary metal, being designed for a predetermined response when the constituent concentration in said filamentary metal corresponds with a predetermined minimum reproducible value, means for controlling said flow connections for subjecting said filamentary metal to an ambient atmosphere corresponding with that of the unknown atmosphere, calibrating means for said system comprising means for controlling said flow connections to change said ambient atmosphere from that corresponding to the unknown atmosphere to one capable of removing said constituent from said metal to reduce it to said minimum value, and means for adjusting the response of said measuring system to establish said predetermined response thereof when said constituent in said filamentary metal has been reduced to said minimum value.

5. In combination, a filamentary ferrous metal whose resistance changes with transference in either direction of a constituent common to both said filamentary metal and an ambient atmosphere, a housing for supporting said filamentary metal within a furnace having an atmosphere for reversible transference of a constituent to and from work disposed therein, a measuring system including said filamentary metal having a predetermined response for predetermined percentage change of resistance values of said filamentary metal at and above a corresponding reproducible known minimum value of concentration of said constituent in said filamentary metal, flow connections to said housing for applying suction thereto, flow restrictions through said housing for flow therethrough of atmosphere from the furnace for changing said ambient atmosphere surrounding said filamentary metal to one corresponding in temperature and composition with that of the furnace for transference of the constituent of the furnace atmosphere to and from said filamentary metal, means for controlling said flow connections to change the ambient atmosphere surrounding said filamentary metal to a constituent-removing character gradually to reduce the value of the constituent in said filamentary metal to said minimum value without affecting the character of said furnace atmosphere, and calibrating means including a circuit element for establishing said predetermined response of said measuring system when said constituent in said filamentary metal has been reduced to said minimum value.

6. The combination set forth in claim 5 in which said constituent is carbon and in which flow connections include a suction pump having the suction side connected to said housing, and a second connection to said housing including a valve for exposing the interior of said housing to restricted flow of air therein to change the character of said ambient atmosphere about said element to one of a carbon-removing character.

7. The combination set forth in claim 5 in which said flow connections include a suction pump having the suction side in communication with said housing, a valve for closing the flow connection to the suction side of said pump and for opening a flow connection to the discharge side thereof leading to said housing.

8. The combination set forth in claim 7 in which there is provided a surge tank on the high-pressure side of said suction pump for flow of a substantial quantity of air into said housing upon operation of said valve rapidly to transform said ambient atmosphere to one of a constituent-removing character.

9. In combination, a filamentary ferrous metal whose resistance changes with transference in either direction of a constituent common to both said filamentary metal and the atmosphere surrounding said metal, a measuring system including said filamentary metal designed for a predetermined known response for a predetermined minimum value of concentration of said constituent in said filamentary metal, a housing for said filamentary metal, a flow control system for changing the character of the atmosphere within said housing surrounding said filamentary metal to correspond with the atmosphere whose constituent-concentration is to be measured, a calibrating system for said filamentary metal comprising means for controlling said flow control system for changing said atmosphere within said housing to one which is capable of reducing the constituent in said metal to a minimum constant value, calibrating means including an adjustable circuit element in said measuring system for establishing said predetermined known response of said measuring system when said constituent in said filamentary metal has been reduced to a minimum constant value, means including circuit transfer means normally connecting said filamentary metal in said network for varying the response of said network in accordance with change of said constituent in said filamentary metal and operable to change the relative connections of said measuring system for a calibrating operation of said adjustable circuit element to produce said predetermined known response, and means operable after said resistance value has attained its minimum constant value for returning said transfer means to its normal position.

10. The combination set forth in claim 9 in which there is provided means operable a time interval after attainment of said minimum value of said constituent for terminating said calibrating operation and returning said transfer means to its normal position.

11. The combination set forth in claim 9 in which the flow control means changes the ambient atmosphere within said housing from a carbon-removing character to one capable of oxidizing said filamentary metal after reduction of its carbon content to its minimum constant value for initiation of a rise in the resistance thereof, and means operable in response to the rise of the resistance of said filamentary metal following the reduction to its minimum constant value for terminating said calibrating operation.

12. The combination set forth in claim 11 in which there is provided means responsive to the last-named rise of resistance for terminating the calibrating operation and for operating said circuit transfer means to its normal position.

13. The combination set forth in claim 11 in which there is provided means responsive to said last-named rise of resistance for terminating the calibrating operation after a predetermined time interval.

14. The combination set forth in claim 11 in which a motor is utilized to adjust said adjustable element, said motor having forward and reverse windings, circuit control means for said motor windings for initial energization of the motor in one direction at the beginning of the calibrating operation and for thereafter disconnecting one of said windings for operation of the motor in one direction only during the remainder of the calibrating operation.

15. The combination set forth in claim 11 in which there is provided an amplifier having an input circuit connected to said measuring system, a relay connected to the output circuit of said amplifier, control means for varying the constituent potential within the furnace, means for operating said control means under the control of said relay and said amplifier, circuit transfer means, means for actuating said last-named circuit transfer means to initiate said calibrating operation, actuating means for said adjustable element and circuit connections completed by said transfer means for controlling said actuating means by said relay.

16. In combination, a filamentary ferrous metal whose resistance changes with transference in either direction of carbon common to both said filamentary metal and an ambient atmosphere, means including a housing for supporting said filamentary metal within, and normally exposed to, a furnace atmosphere, a measuring system including said filamentary metal for indicating the carbon potential exerted by the atmosphere to which said metal is exposed, flow connections extending from said housing for flow of said furnace atmosphere into said housing, means for controlling said flow connections gradually to change the atmosphere within said housing without effect upon the furnace atmosphere progressively to remove carbon from said filamentary metal to reduce its carbon content to a known reproducible minimum value, a circuit element in said measuring system for calibrating the same, and means for controlling the final position of said calibrating circuit element in calibration of said system by attainment of said filamentary metal of said minimum reproducible value of carbon content.

17. In combination, a filamentary ferrous metal whose resistance changes with transference in either direction of a constituent common to both said filamentary metal and an ambient atmosphere, a housing for supporting said filamentary metal within a furnace having an atmosphere for reversible transference of a constituent to and from work disposed therein, a measuring system including said filamentary metal designed for a predetermined response for resistance values of said filamentary metal at and above a reproducible minimum value of concentration of said constituent in said filamentary metal, flow connections to said housing, flow restrictions within said housing for flow therethrough of the atmosphere from the furnace for changing said ambient atmosphere to which said filamentary metal is subjected to correspond in temperature and composition with that of the furnace for transference of the constituent of the furnace atmosphere to and from said filamentary metal, an indicator operable in accordance with response of said measuring system to resistance change of said filamentary metal for indicating the constituent potential within said furnace, means for controlling said flow connections to change said ambient atmosphere surrounding said filamentary metal independent of the furnace atmosphere to a constituent-removing character gradually to reduce the value of the constituent in said filamentary metal to said minimum value and simultaneously to disconnect said indicator from said system, and calibrating means including a circuit element for establishing said predetermined response of said measuring system when said constituent in said filamentary metal has been reduced to said minimum value.

18. In combination, a filamentary ferrous metal whose resistance changes with transference in either direction of carbon present in said filamentary metal and present in an unknown atmosphere, a measuring system of the Wheatstone bridge type including in the respective arms thereof said filamentary metal, a calibrating resistor, and additional resistors, two of which have values for producing a known response of said bridge corresponding with a known reproducible minimum value of carbon in said filamentary metal, said additional resistors being connected in adjacent arms of said bridge, a third of said additional resistors being adjustable, a device normally connected to said adjustable resistor for detecting unbalance of said bridge, transfer means for transferring the connections of said detecting device from said adjustable resistor to the juncture of said two resistors, means for surrounding said filamentary metal with a carbon-removing atmosphere without substantially changing the character of said unknown atmosphere, means including said detecting device for adjusting said calibrating resistor to balance said measuring system as said filamentary metal attains said minimum value of carbon, and means for thereafter operating said transfer means to return said system to normal operation with said calibrating resistor in its last adjusted position.

19. In combination, a filamentary ferrous metal whose resistance changes with transference in either direction of a constituent common to both said filamentary metal and an ambient atmosphere, a measuring system of the Wheatstone bridge type including said filamentary metal in a first arm thereof, a second resistor and a third resistor respectively connected in the second and third arms thereof with a slidewire therebetween, said second and third resistors and said slidewire having values which establish a range of movement of said slidewire relative to its associated contact corresponding with a scale calibrated in terms of change of constituent in said filamentary metal, means including a calibrating slidewire in the fourth arm of said bridge, the per cent change of resistance of said filamentary metal above a reproducible minimum level corresponding with the calibration of said scale, and means for bringing said measuring system into calibration comprising means for reducing the constituent in said filamentary metal to said reproducible value, and means for adjusting said calibrating slidewire to establish the same relationship between said first and fourth arms of said bridge as established between said second and third arms of said bridge.

20. A system of measuring impedance comprising a sensitive element, a network of the Wheatstone bridge type including said sensitive element in one arm thereof, an impedance element in the second arm thereof, calibrating impedances respectively connected in the third and fourth arms of said network with a calibrated variable impedance connected therebetween and having a scale of range corresponding with the range of change of impedance of said sensitive element, means for adjusting said variable impedances electrically to shift said calibrated impedance in said network to calibrate said network, a source of supply for said network, a variable impedance connected between two adjacent arms of said bridge and said source of supply, means responsive to the ambient temperature of said sensitive element for adjusting said last-named impedance to compensate in the network for changes in impedance of said sensitive element due to changes in said ambient temperature, exhibiting means having an element movable relative to a scale, and means for controlling said movement of said last-named element with respect to said scale comprising a subsidiary network including an adjustable impedance connected in shunt with said calibrated impedance.

21. A system of measuring constituent potentials comprising a sensitive element whose resistance changes with the content of a constituent therein, a network of the Wheatstone bridge type including said sensitive element in one arm thereof, a resistance element in a second arm thereof, calibrating resistors respectively connected in the third and fourth arms of said network with a calibrated variable resistor connected therebetween and having a scale of a range corresponding with the range of change of constituent content of said sensitive element, means for adjusting said variable resistors electrically to shift said calibrated resistor in said network to calibrate the network at a time when the constituent content of said sensitive element is at a minimum known reproducible value, a source of supply for said network, a variable resistor connected between two adjacent arms of said bridge and said source of supply, means responsive to the ambient temperature of said sensitive element for adjusting said last-named resistor to compensate in the network for changes in resistance of said sensitive element due to changes in said ambient temperature to assure response of said network to change in the constituent content of said element unaffected by change in said ambient temperature, exhibiting means having an element movable relative to a scale calibrated in terms of the constituent potential to which said sensitive element is subjected, and means for controlling said movement of said last-named element with respect to said scale comprising a subsidiary network including an adjustable resistor connected in shunt with said calibrated variable resistor.

22. A system of measuring the carbon potential within a carburizing furnace comprising a sensitive element subjected to the atmosphere and temperature of said furnace and whose resistance changes with carbon content therein, a network of the Wheatstone bridge type including said sensitive element in one arm thereof, a resistance element in a second arm thereof, calibrating resistors respectively connected in the third and fourth arms of said network with a calibrated variable resistor connected therebetween and having a scale of a range corresponding with the range of change of carbon content of said sensitive element, means for adjusting said variable resistors electrically to shift said calibrated resistor in said network to calibrate the network at a time when the carbon content of said sensitive element is at a minimum known reproducible value, a source of supply for said network, a variable resistor connected between two adjacent arms of said bridge and said source of supply, means responsive to the ambient temperature of said sensitive element for adjusting said last-named resistor to compensate in the network for changes in resistance of said sensitive element due to changes in said ambient temperature to assure response of said network to change in the carbon content of said element unaffected by change in said ambient temperature, means controlled by said bridge for controlling the carbon potential of said atmosphere within said furnace, exhibiting means having an element movable relative to a scale calibrated in terms of the carbon potential to which said sensitive element is subjected, and means for controlling said movement of said last-named element with respect to said scale comprising a subsidiary network including an adjustable resistor connected in shunt with said calibrated variable resistor.

23. In combination, a filamentary ferrous metal whose resistance changes with transference in either direction of carbon common to both said filamentary metal and its ambient atmosphere, a housing for said filamentary metal within which said ambient atmosphere is contained, said housing having an inlet for ingress of an atmosphere whose carbon potential is to be measured, an air inlet to said housing spaced from the location of said first-named inlet and from said filamentary metal, and means for regulating flow through said air inlet for diffusion of air with the ambient atmosphere surrounding said filamentary metal to impart to said atmosphere the characteristic of removing carbon from said filamentary metal without oxidizing said filamentary metal.

24. The combination set forth in claim 23 in which the continuous introduction of air through said air inlet gradually and progressively increases the effectiveness of said ambient atmosphere in removing carbon from said filamentary metal to reduce the carbon content of said filamentary metal to a minimum reproducible value.

25. The combination set forth in claim 23 in which the air flow through said inlet is at low rate and the volume of the housing for said filamentary metal is large enough for such thorough diffusion at said flow rate of the air as to assure the subjection of said filamentary metal to fully reacted gases in the region in which the filamentary metal is located, said inflowing air being effective continuously to increase the carbon-removing capability of the ambient atmosphere surrounding said filamentary metal at a rate substantially corresponding with the diffusion rate of air through said ambient atmosphere.

26. The method of calibrating an electrical measuring system for measurement of a constituent potential of an atmosphere in terms of change in resistance of a filamentary ferrous metal with change in said constituent potential due to transference of the constituent to and from said metal, which comprises progressively reducing said constituent potential of the atmosphere surrounding said filamentary metal to produce transference of said constituent from said filament to said atmosphere with progressive reduction of the resistance of said filamentary metal, said resistance attaining a temporarily fixed but unknown value at the time said constituent within said filamentary metal reaches a known reproducible low value, and adjusting the response of the measuring system to said fixed but unknown value of said resistance to coincide with said reproducible low value of said constituent prior to rise of resistance of said filamentary metal due to causes other than further change of said constituent within said filamentary metal.

References Cited in the file of this patent

UNITED STATES PATENTS

| Number | Name | Date |
|---|---|---|
| 2,349,767 | Solakian et al. | May 23, 1944 |
| 2,441,149 | Hays | May 11, 1948 |
| 2,459,618 | Cartier | Jan. 18, 1949 |
| 2,465,864 | Freeman et al. | Mar. 29, 1949 |
| 2,502,167 | Moore | Mar. 28, 1950 |
| 2,541,857 | Besselman et al. | Feb. 13, 1951 |